BIAS RESTORATION ARRANGEMENT FOR DIGITAL CIRCUIT MATRIX
Filed Feb. 15, 1967
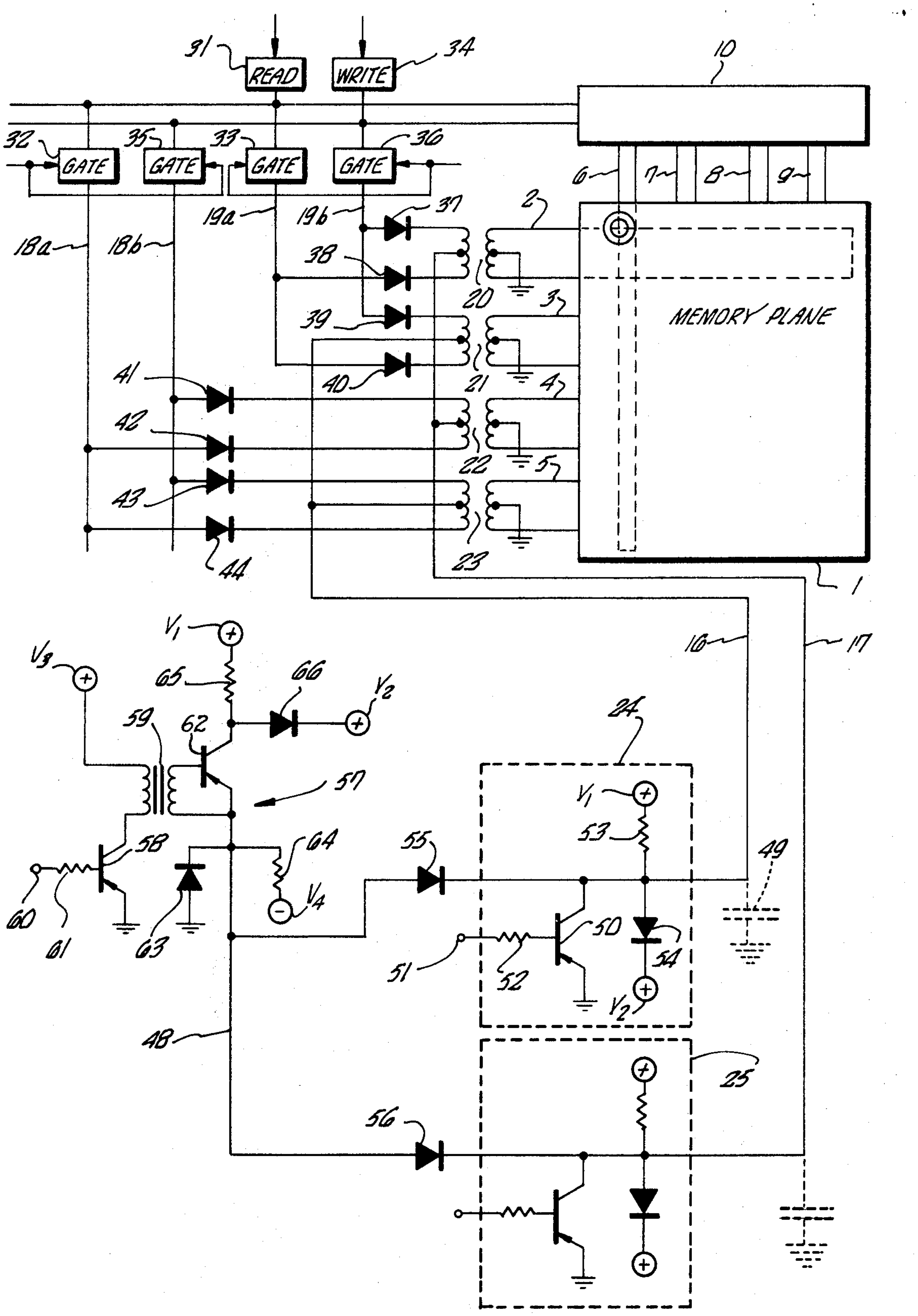

United States Patent Office

3,519,995
Patented July 7, 1970

3,519,995

BIAS RESTORATION ARRANGEMENT FOR DIGITAL CIRCUIT MATRIX

Charles P. Gerrard, Pasadena, Calif., assignor to Burroughs Corporation, Detroit, Mich., a corporation of Michigan

Filed Feb. 15, 1967, Ser. No. 616,364
Int. Cl. H04q *1/28*
U.S. Cl. 340—166 13 Claims

ABSTRACT OF THE DISCLOSURE

A common bias restoration switch to serve a plurality of row or column leads of a circuit matrix. The restoration switch is coupled to the leads through diodes that isolate the leads from one another. The diode is biased so it will conduct current only during the time period in which the restoration switch is actuated and then only between the restoration switch and the lead to be restored.

This invention relates to digital data handling systems and, more particularly, to an arrangement for rapidly restoring a digital circuit matrix to its stand-by bias condition after energization.

Circuit matrices are commonly employed arrangements in digital data handling systems. Such matrices comprise a number of intersecting rows and columns of leads with a utilization device at each intersection. When a row lead and a column lead are energized by digital signals, the utilization device at their intersection is actuated. A typical use of a circuit matrix is to select one of a plurality of drive lines of an addressable memory device.

During intervals in which the row and column leads are not energized by digital signals, they are maintained at a stand-by bias potential. In order to avoid excessive power consumption in the stand-by condition, the leads are commonly biased through a series circuit including a large resistance. A significant amount of stray capacitance however is often associated with each lead. As a result, the time required to charge the stray capacitance to the stand-by potential sometimes imposes a limitation on the speed of operation of the matrix. Accordingly, it has been found necessary to devise restoration circuitry to aid the return of the row and/or column leads to the stand-by bias potential so as to permit operation of the matrix at a higher speed.

One arrangement for aiding restoration of a stand-by condition to the leads of a matrix is disclosed in Brown Pat. 3,423,603 which issued on Jan. 21, 1969, to the assignee of the present application. In this patent, each row lead has a binary switch that provides a path to ground through the emitter-to-collector circuit of one transistor while the lead is energized and a low resistance path to the stand-by bias potential source through the emitter-to-collector circuit of another transistor during restoration. In this way, a row lead charges to its stand-by bias potential through a low resistance circuit path after it has been energized.

In contrast thereto, the present invention contemplates a single switch for restoring all the row or column leads of a matrix. This restoration switch is coupled to each row or column lead through a unilateral conducting device, such as a diode, adapted so current flows only while the restoration switch is actuated and only then between the restoration switch and the energized lead to the exclusion of the other leads. Thus, the leads remain isolated from one another although served by a common restoration switch. This isolation is insured by clamping the junction of the restoration switch and the unilateral conducting devices to a potential while the restoration switch is not actuated. This potential back-biases the unilateral conducting device over the complete range of potentials on the leads.

These and other features of the invention are considered further in the following detailed description taken in conjunction with the drawing, the single figure of which is a schematic circuit diagram of a matrix that employs a restoration arrangement according to the invention.

In the drawing, the numeral 1 designates a memory horizontal drive line is selected in the drive circuitry plane in which magnetic cores are arranged in columns and rows. The memory plane is of the conventional type in which pairs 2, 3, 4, and 5 of horizontal drive lines couple each of the cores in a row and pairs 6, 7, 8, and 9 of vertical drive lines couple each of the cores in a column. Although only four pairs of horizontal drive lines and four pairs of vertical drive lines are shown to illustrate the principles of the invention, in practice as many as several hundred are commonly used. Drive circuitry for the horizontal drive lines is shown in detail in the drawing. Drive circuitry for the vertical drive lines, which could be identical to that shown for the horizontal drive lines, is represented by a block designated 10. The desired horizontal drive line is selected in the drive circuitry through a matrix comprising row leads 16 and 17 and pairs 18*a*, 18*b*, and 19*a*, 19*b* of column leads. At the intersections of the matrix, transformers 20, 21, 22, and 23 couple the row and column leads to horizontal drive line pairs 2, 3, 4, and 5, respectively. A row selection switch 24 is connected by row lead 16 to a center tap on the primary of transformers 21 and 23, while a row selection switch 25 is connected by row lead 17 to a center tap on the primary of transformers 20 and 22. If the matrix had more rows, a selection switch would be provided for each additional row lead.

Switches 24 and 25 are identical. For the sake of simplicity, only the components of switch 24 are labeled. The collector of a transistor 50 is directly connected to lead 16 while its emitter is directly connected to ground. To energize lead 16, a row selection signal is applied to an input terminal 51, which is coupled to the base of transistor 50 through a resistor 52. A source of positive potential $V_1$ is connected by a resistor 53 to the collector of transistor 50. A source of positive potential $V_2$, which is smaller than potential $V_1$, is connected by a diode 54 to the collector of transistor 50. The stray capacitance associated with lead 16 and transformers 21 and 23 is represented by a phantom capacitor 49. Normally, transistor 50 is cut off and its collector is clamped to a stand-by bias potential slightly above potential $V_2$. Upon application of a negative row selection signal to input terminal 51, transistor 50 becomes saturated. As a result, the collector of transistor 50 is clamped substantially to ground, which energizes lead 16.

A read circuit 31 is coupled by transmission gates 32 and 33 to column leads 18*a* and 19*a*, respectively. A write circuit 34 is coupled by transmission gates 35 and 36 to column leads 18*b* and 19*b*, respectively. Column leads 19*b* and 19*a* are connected by diodes 37 and 38, respectively, to the ends of the primary of transformer 20 and by diodes 39 and 40, respectively, to the ends of the primary of transformer 21. Similarly, column leads 18*b* and 18*a* are connected by diodes 41 and 42, respectively, to the ends of the primary of transformer 22 and by diodes 43 and 44, respectively, to the ends of the primary of transformer 23.

The outputs of gates 32, 33, 35, and 36 are normally biased negative. Since row selection switches 24 and 25 are normally biased positive, diodes 37 through 44 are normally back-biased. To select a pair of column leads, the corresponding pair of transmission gates (32 and 35 or 33 and 36) are activated by a column selection signal applied to their control input terminals. Thereafter, upon generation of a positive polarity pulse by read circuit 31 or write circuit 34, one of diodes 37 through 44 becomes forward-biased, depending upon which row lead and which pair of column leads have been selected and depending upon whether a read or write pulse has been generated. Consequently, one of transformers 20 through 23 couples a pulse to the corresponding one of horizontal drive line pairs 2 through 5. The coupled pulse is of one polarity for reading and the other polarity for writing.

After one of drive lines 2 through 5 has been energized, another drive line cannot be selected until the center taps on the primaries of the transformers (20 and 22 or 21 and 23) corresponding to the selected row lead (16 or 17) have first substantially returned to the stand-by bias potential $V_2$. Resistor 53 is large so as to minimize power consumption. If the selected row lead had to be restored to the stand-by bias potential with resistor 53 serving as the charging path for the stray capacitance of the selected row lead, the return would be relatively slow became of the large time constant. Thus, a bias restoration arrangement is provided to accelerate the return to the stand-by bias potential.

According to the invention, a common restoration switch 57 serves both row leads 16 and 17, being coupled to selection switches 24 and 25 through restoration bus 48 and diodes 55 and 56, respectively. If a larger matrix with more row leads were involved, each lead would be coupled to switch 57 through a different diode. At the input of switch 57, a transistor 58 is provided having its emitter connected to ground and its collector connected through the primary of the transformer 59 to a source of positive potential $V_3$. A negative restoration signal, which immediately follows the termination of the selection signal of switches 24 and 25, is applied to an input terminal 60 connected through a resistor 61 to the base of transistor 58. The secondary of transformer 59 is connected between the base and emitter of a transistor 62. The emitter of transistor 62 is connected to switches 24 and 25 through diodes 55 and 56, respectively, and bus 48. The emitter of transistor 62 is also connected by a diode 63 to ground and by a resistor 64 to a source of negative potential $V_4$. The collector of transistor 62 is connected by a resistor 65 to source $V_1$ and by a diode 66 to source $V_2$. The latter are the same sources of positive potential as the sources of switch 24 that bear the same designation. Thus, under ordinary operating conditions, the collector of transistor 62 remains clamped to potential $V_2$.

Normally, diode 63 is forward-biased by source $V_4$ so that the emitter of transistor 62 is clamped to a negative potential slightly above ground. This prevents an accumulation of charge and insures that diodes 55 and 56 remain back-biased while switches 24 and 25 are operating and before a restoration signal is applied to switch 57. Thus, diodes 55 and 56 isolate leads 16 and 17 from one another so when one lead is grounded the other lead remains at the stand-by potential. Immediately after each time a row selection signal ends, a restoration signal is applied to input terminal 60 of switch 57. As a result, transistor 58 begins to conduct and a pulse is coupled across transformer 59 to the emitter-to-base circuit of transistor 62. This pulse causes transistor 62 to become saturated. Consequently, the emitter of transistor 62 rises to a positive potential of substantially $V_2$, thereby back-biasing diode 63 and forward-biasing the diode (55 or 56) corresponding to the selection switch (24 or 25) that was just saturated. Thus, a low resistance charging path from source $V_2$ is established through diode 66, the collector-to-emitter circuit of transistor 62, and the diode (55 or 56) corresponding to the selection switch (24 or 25) just saturated, and the previously energized row lead is restored rapidly to the standby potential $V_2$. At the same time, the diode (55 or 56) corresponding to the other selection switch (24 or 25) is back-biased, thereby blocking the flow of current to the other selection switch. After the effect of the restoration signal between the emitter and the base of transistor 62 is dissipated, transistor 62 cuts off and the low resistance path is opened.

In the embodiment shown, the timing cycle is such that no restoration is necessary for the column leads. If the circumstances required it, however, the same type of bias restoration arrangement shown in the drawing could also be employed for the column leads.

What is claimed is:

1. A bias restoration arrangement for aiding the return of one of a plurality of matrix leads to a stand-by bias potential after an energizing potential is established on the lead comprising:

means individual to each lead for clamping it either to the stand-by bias potential or to the energizing potential;

a restoration bus;

disconnectable means for applying a source of potential through a low resistance path to the bus, the source of potential being of such polarity and magnitude as to aid the return from the energizing potential to the stand-by potential; and means for coupling only the one lead to the us so as to establish current flow between the source and the one lead through the low resistance to aid return of the one lead to the stand-by potential, the remaining leads being blocked from the bus.

2. The bias restoration arrangement of claim 1, in which the coupling means are unilateral conducting devices connected between the bus and each lead, the unilateral devices being poled to conduct current only between the source and the one lead on which the energizing potential has been established.

3. The bias restoration arrangement of claim 2, in which the bus is clamped to a potential that back-biases all the unilateral conducting devices while the applying means are disconnected.

4. The bias restoration arrangement of claim 3, in which the source potential is substantially equal in magnitude and of the same polarity as the stand-by potential and each lead is connected by the clamping means to the stand-by bias potential through a high resistance path.

5. The bias restoration arrangement of claim 1, in which the source potential is substantially equal in magnitude and of the same polarity as the stand-by potential.

6. The bias restoration arrangement of claim 1, in which each lead is connected by the clamping means to the stand-by bias potential through a high resistance path.

7. A bias restoration arrangement comprising:

a digital matrix having a group of row leads and a group of column leads;

a selection switch connected across each lead of at least one group to switch the potential on the lead between a first value and a second value;

a source of potential, the source being of such magnitude and polarity to aid restoration of a lead at the first potential value to the second potential value;

a restoration switch for providing upon actuation a low resistance path to the source;

means for actuating the restoration switch immediately following the switching of a selection switch to the second potential value; and a unilateral device individual to each lead adapted to conduct current only between the source and a lead at the first potential value.

8. The bias restoration arrangement of claim 7, in which each unilateral device is a diode poled to conduct current between the source and a lead at the first potential value to the second value.

9. The bias restoration arrangement of claim 8, in which the restoration switch and diodes are joined at a junction and the junction is clamped to a potential at all times except while the restoration switch is actuated, the potential back-biasing the diodes for all potential values encountered at the selection switches.

10. The bias restoration arrangement of claim 7, in which each selection switch comprises: a source of potential larger than the second value; a large resistor connected between the last named source and the lead; a source of potential of the second value; a diode connected between the lead and the source of second value potential, the diode being poled to conduct absent external influence on the lead; and means responsive to a lead selection signal for clamping the lead to a potential of the first value.

11. The bias restoration arrangement of claim 10, in which the clamping means is a transistor, the collector of which is connected to the lead, the emitter of which is connected to ground, and the base of which is adapted to accept the lead selection signal.

12. The bias restoration arrangement of claim 7, in which the restoration switch comprises a transistor, the collector of which is connected to the source, the emitter of which is connected to the unilateral devices, and the emitter-to-base circuit of which is adapted to cause the transistor to become saturated upon actuation of the restoration switch.

13. The bias restoration arrangement of claim 12, in which the collector is clamped to a potential of the second value.

References Cited

"Matrix Store With Short Reset Time," Christoperson, IBM Tech. Div. Bull., vol. 5, No. 10, March 1963, page 90.

"Current Driver Circuit With Controlled Charge Compensation," Leilich, IBM Tech. Div. Bull., vol 6, No. 9, February 1964, pages 87, 88.

"Level Restoring For Array With Steering Diodes," Genko, IBM Tech. Div. Bull., vol. 8, No. 2, July 1965, page 335.

THOMAS A. ROBINSON, Primary Examiner

U.S. Cl. X.R.

340—174

O-1050
(5/69)

UNITED STATES PATENT OFFICE

CERTIFICATE OF CORRECTION

Patent No. 3,519,995 Dated July 7, 1970

Inventor(s) Charles P. Gerrard

It is certified that error appears in the above-identified patent and that said Letters Patent are hereby corrected as shown below:

Column 2, line 11, should be deleted in its entirety.

Column 3, line 22, "became" should be --because--.

Column 4, line 24, "us" should be --bus--.

SIGNED AND SEALED
DEC 8 1970

(SEAL)
Attest:

Edward M. Fletcher, Jr.
Attesting Officer

WILLIAM E. SCHUYLER, JR.
Commissioner of Patents